Patented Sept. 14, 1948

2,449,295

UNITED STATES PATENT OFFICE 2,449,295

PREPARATION OF AUTOREGENERATIVE CATALYSTS

Carlos L. Gutzeit, San Francisco, Calif., assignor to Shell Development Company, San Francisco, Calif., a corporation of Delaware No Drawing. Application March 19, 1943, Serial No. 479,819

6 Claims. (Cl. 252—254)

This invention relates to improved catalytic agents of a new type, and to new and improved processes for effecting catalytic conversions with the new type of catalysts of the invention. More particularly, the invention relates to catalysts of a new type having high and selective dehydrogenation and dehydrocyclization activities and which are adapted to be employed in an autoregenerative manner, and to processes for the catalytic dehydrogenation and/or dehydrocyclization of various materials in an autoregenerative manner.

Since the discovery or recognition of catalysis, this branch of chemistry has been developed largely on an empirical basis. Based upon theoretical considerations and empirical data and observations, various theories or working hypotheses have been developed from time to time and these have helped to gradually gain a better insight and knowledge of catalytic action and to make the development of new and better catalysts possible. On the whole, however, it is generally recognized that the study of catalysis from a purely scientific point of view, instead of leading the art, is far behind the technological developments brought about by cut-and-try methods. In the catalytic conversion of hydrocarbons and related compounds, especially at higher temperatures where tremendous advances have been made, the systems are especially complicated and very little is understood regarding the manner of action of the various catalysts employed.

In the field of catalytic dehydrogenation and dehydrocyclization, to which the present invention relates, a great deal of work has been done to produce new and better catalysts. Since the methods employed have been almost entirely empirical, this had led to the discovery of an almost unbelievable array of compounds and mixtures of compounds which have been shown to possess more or less dehydrogenation and/or dehydrocyclization activity. Thus, for example, it is found that most of the metals and especially the heavy metals, most of the metal oxides, a great number of compounds of the metals, and even certain non-metals such as sulfur, etc. are capable of catalyzing dehydrogenation of one material or another. By far the largest proportion of these various materials are, however, totally unsuited or quite inferior for practical application. They are either not sufficiently active, are not sufficiently selective, or have other major defects such as very short active life. Of these various materials, those coming into consideration for practical application are therefore very few in number and these few are largely confined to the oxides and a few compounds of a select group of elements, most of which are members of group VI of the periodic table. Thus, for example, chromium oxide is by far the best dehydrocyclization agent and one of the best dehydrogenating agents known. Most of the practical dehydrogenation and dehydrocyclization processes therefore employ catalysts of this select group such, in particular, as the oxides of chromium or molybdenum.

All of the known dehydrogenation catalysts (even those especially developed for the purpose), when used for the dehydrogenation of organic materials at elevated temperatures, lose their activity in a relatively short period of time due to the deposition thereon of carbonaceous materials. In order to afford a practical process it is therefore necessary to remove these carbonaceous deposits periodically. This is usually done by a regeneration or reactivation treatment in which the carbonaceous deposits are burned off by an oxidizing gas such as air. In order to effect the regeneration it is necessary to stop the process, flush the catalyst of reactants, bring the catalyst chamber from the processing temperature to the regeneration temperature, effect the actual burning treatment, flush the catalyst of oxidizing gases, and bring the catalyst chamber back to the processing temperature. This requires a considerable proportion of the total time and results in a large loss in production capacity per volume of reactor space, particularly when this operation must be repeated several times per day. The process is furthermore expensive per se and is detrimental to the catalyst. In view of these disadvantages which are well understood and appreciated by those skilled in the art, the necessity for regenerating the catalyst after every few hours of processing is by far the greatest drawback of the known processes.

In order to reduce these various important disadvantages to a minimum, every effort has been made to decrease the frequency of the regeneration (increase the permissible on-stream period) in these processes. Although some improvements have been made in this direction by improving the methods and provisions for very accurate heat control, by far the greatest improvements have been made in the development of specialized catalysts which are relatively specific for dehydrogenation and/or dehydrocyclization and have a decreased tendency to cause the formation of the carbonaceous deposits which cause the relatively rapid decline in the catalytic activity. Thus, the newer catalysts such, for instance, as those described in U. S. Patents 2,271,751 and 2,249,337 may be used in the dehydrogenation and dehydrocyclization of hydrocarbons with process periods of several hours. Even with such highly specialized catalysts, however, the frequency of regeneration required is a major disadvantage.

While occupied in the development of certain dehydrogenation and dehydrocyclization processes to practical processes, I evolved and developed a new and unique working hypothesis which I proceeded to apply. For the present purpose, it will suffice to say that, according to this hypothesis of the action of the catalysts in dehydrogenation and dehydrocyclization processes, it appeared possible to produce catalysts which are self-regenerative (autoregenerative). It further appeared that these catalysts could be so adjusted that the conditions required for the maximum autoregeneration effect coincide with those allowing high and selective dehydrogenation and/or dehydrocyclization activity. On the basis of the mentioned hypothesis regarding the catalytic action, I have developed and perfected such catalysts.

It will be noted that while I was striving for the same ultimate goal as others in the art, namely, the reduction or complete elimination of the periodic regeneration treatment, the development proceeded by a distinct and unique path which was in a direction quite different from that being followed by others in the art using entirely different working hypotheses. This is mentioned since it will be found in the following description of the catalysts and processes of my invention that many facts and statements may appear to be contrary to statements and the general belief in the art and it may be difficult to apply the teachings and beliefs now prevalent in this art. In many respects, the catalysts of my invention will appear to resemble previously suggested catalysts which have long since been abandoned in favor of the newer and superior catalysts such as mentioned above. As I will attempt to clearly point out, however, differences in composition, preparation and conditions of use which, according to present beliefs in the art appear to be trivial or insignificant, are of the utmost importance.

As pointed out above, the catalysts of my invention are specifically compounded and prepared (1) to afford a maximum autoregenerative effect and (2) to afford this maximum autoregenerative effect under autoregeneration conditions which are conducive to high and selective dehydrogenation or dehydrocyclization action. It will be appreciated therefore that in order to secure optimum results the catalyst composition will vary within defined limits depending upon the particular dehydrogenation reaction and the particular conditions of temperature, etc. It will also be appreciated that the use of conventional and known catalysts under the conditions of the invention, or the use of the catalysts of the invention under conditions other than those specified, cannot be expected to lead to my improved results. It will furthermore be appreciated that the improvements obtained in the processes of the invention are in increased production capacity, decreased processing costs, lowered catalyst replacement costs, etc. and not necessarily in increased conversions per pass. It is recognized that some of the newly developed catalysts, such as now used in such processes, are very active and selective and may appear superior to the catalysts of the invention when compared solely on the conversion per pass. Such a comparison would, however, be improper in attempting to evaluate the merits of the processes.

The catalysts of the present invention contain as the predominating active dehydrogenating agent an oxide of a metal selected from the group consisting of iron and cobalt. These metal oxides may be employed singly or in combination. Furthermore, they may be replaced in part by an oxide of manganese or nickel. These are the only dehydrogenating metal oxides, the reduction-oxidation characteristics of which are such that they may be made autoregenerative under the conditions required for the desired dehydrogenation and dehydrocyclization. They are easily reduced to the corresponding metal and are hereinafter referred to as the reducible oxide components of the catalysts. It is recognized that the oxides of these metals have long been known to possess dehydrogenating activity and have from time to time been suggested as catalysts in various combinations for certain dehydrogenation processes. However, these catalysts are unstable, are noted for their high carbon-forming tendencies, and are generally recognized as quite inferior to the newer catalysts. In fact, it will be noted that in the newer oxide catalysts for dehydrocyclization, such as the specially developed chromium oxide catalysts (as well as siliceous cracking catalysts), every effort is made to exclude even traces of these metal oxides in order to avoid severe coking and actual plugging of the catalyst mass with carbon. In such cases where metals of the iron group are present in the catalyst or are prone to be transferred to the catalyst even in traces from the heating coils, reaction tubes, etc., it is usually necessary to periodically treat the apparatus with hydrogen sulfide or add a sulfur compound with the feed. This apparently converts the iron group metal oxide to the sulfide which has a much smaller carbon-forming tendency. In this connection attention is directed to U. S. Patents 2,269,028 and 2,168,840.

The reducible metal oxides are not employed per se but in combination with relatively large amounts of a difficultly reducible metal oxide, namely, aluminum oxide. Other difficultly reducible oxides (such as silica gel, magnesia, etc.), although they have been recommended in other catalysts, have excessive cracking tendencies or other defects which make them unsuited for use in the catalysts of the invention. The active reducible metal oxides and the difficultly reducible oxide may be employed in a wide range of ratios, the limits of which are critical. The applicable range is that in which the two components at equilibrium exist as mixed crystals. Thus, as the concentration of alumina in the iron oxide is increased, starting at 0% alumina, the alumina exists in true solution in the iron oxide up to an alumina concentration of about 25 mol per cent. Between a mol concentration of from about 25% alumina up to a concentration of about 80 mol per cent alumina, there is a miscibility gap where mixed crystals exist. At concentrations of alumina above about 80 mol per cent the iron oxide exists in true solution in the alumina. Now, it is found that as the alumina concentration is increased from 0 mol per cent to 100 mol per cent, the activity of the mixture for dehydrogenation under any given set of conditions increases, passes through a maximum, and then declines to a very low value. On the basis of this fact alone, almost any ratio of the reducible oxide and the difficultly reducible oxide could be employed and the most desirable ratio would be that corresponding to the maximum point. If the ability of the mixture to retain its dehydrogenating activity after heating (for instance, in one or more regeneration treatments) is considered, however, it is found that whereas compositions falling outside of the miscibility gap are all very unstable, those falling within the miscibility gap are of uniform and of fair stability. The ratios of reducible oxides to difficultly reducible oxide in the catalysts of the invention lie in this miscibility gap where mixed crystals exist and are preferably adjusted to correspond to the maximum activity. Within this total range which corresponds to between about 20 and 75 mol per cent of the reducible metal oxide (calculated as $R_2O_3$), the composition corresponding to the maximum activity varies somewhat depending upon the temperature at which the catalyst is to be employed. In general, the optimum concentration of the reducible metal oxide corresponding to maximum activity varies between about 20 and 40 mol per cent and a preferred concentration giving very excellent catalysts for general use is about 30 mol per cent.

While the catalysts of the invention have been described as containing certain easily reducible oxides and aluminum oxide in certain critical ratios, not all such mixtures are suitable. These various oxides are capable of existing in several allotropic forms and the reducible metal is capable of existing in various states of oxidation. As will be apparent from the following, it appears that a particular allotropic form of the reducible metal oxide, a particular allotropic form of the alumina, and a particular state of oxidation of the reducible metal oxide are necessary. While I do not desire to be bound by the correctness of any theories, I believe that the essential allotropic form of these components is that having a crystal lattice of the spinel type, and that the reducible oxide in the present catalysts is predominantly in a state of oxidation-reduction to about $R_3O_4$. Regardless of whether or not the above opinions are correct, it is true that the particular forms necesary in the catalyst are produced by the specified methods of preparation of the catalyst and that the critical state of oxidation of the reducible oxide is produced and maintained by the specified methods of preparation, the specific concentrations of the remaining constituents of the catalysts, and the reaction conditions, all presently to be described.

Suitable composites of the reducible oxide and alumina may be prepared in a variety of manners, provided certain precautions are taken. One suitable method is by coprecipitation of the mixed oxides. Another suitable method is by forming separately the hydrogels of the two types of oxides and subsequently mixing the hydrogels in the desired proportions. Methods involving actual fusion of the components and also the various methods of impregnating one solid component with the other give very inferior catalysts.

In forming the mixed oxides in the wet way by co-precipitation or precipitation of the separate hydrogels, it is found that various of the conditions applied have a very great influence on the qualities of the finished catalysts. Thus, in order to prepare the most active and efficient catalysts, it is necessary to consider the conditions of the precipitation particularly with respect to the kind of anions present, the pH of the solution, and the concentration.

The hydrous oxides may be precipitated from most of the various water-soluble salts such as the nitrates, sulfates, etc. It is found, however, that the anion present during the precipitation greatly influences the character of the finished catalyst. Thus, it is found that catalysts prepared from hydrous oxides, which have been precipitated in the presence of substantial concentrations of strongly adsorbable anions which are decomposed upon heating to form volatile compounds, are much superior to those prepared from hydrous oxides precipitated in the presence of other anions. Particularly suitable anions of this class are the sulfate and acetate anions. The acetate ion is less effective than the sulfate ion but may be advantageously employed in certain cases, particularly where the catalyst is to be used to convert a material containing an appreciable amount of sulfur. The halides generaly give inferior products and are not preferred. The desired ion may be provided either by employing the corresponding salt of the metal to be precipitated or by adding a soluble salt containing the desired anion. Thus, one may apply the sulfates and/or acetates of the metals to be precipitated or one may employ the nitrates in the presence of, for instance, ammonium sulfate and/or acetate. It is to be noted that in the above respect the catalysts of the invention are distinctly different from the preferred prior art catalyst comprising chromium oxide and/or molybdenum oxide. In these prior art catalysts it is known that even traces of sulfates act as severe poisons and for this reason all sulfates are carefully excluded in the preparation of the cataylsts. In the catalysts of the present invention sulfates are not harmful but are decidedly advantageous. Thus, although the mixed hydrogels are spoken of as consisting of the mixed oxides (hydroxides), the preferred hydrogels prepared in the presence of sulfate actually contain between about 5 and 12 per cent of sulfate (on dry basis), even after washing until the wash water is substantially free of sulfates. This sulfate is apparently occluded and/or adsorbed in the hydrous oxides.

The precipitation may be effected with any of the common bases such as the hydroxides, carbonates, or bicarbonates of sodium, potassium and ammonium. Ammonium hydroxide, for example, is very suitable and perhaps the most practical agent. The solutions employed are preferably quite dilute, for instance, below about 0.5 molar. When employing ammonium hydroxide as the precipitant, for instance, it is desirable to employ solutions of such concentrations that the final concentration with respect to ammonium ion is between about 0.03 and 1.0 molar.

The precipitation should be carried out in such a manner that the pH of the solution does not fall below about 6.0 and the final pH (as determined on the supernatant liquid) should preferably be between 6.5 and 8.0. Within this range the final pH is preferably adjusted in accordance with the mol concentration of the reducible metal oxide. When the reducible metal oxide is in mol excess with respect to the alumina, the final pH is preferably in the lower portion of this range, for instance, between about 7.0 and 7.3 and, conversely, in the more usual case where the difficultly reducible metal oxide is in mol excess, the final pH is preferably slightly higher, for instance between about 7.3 and 8.0.

After the precipitation, the hydrous oxides are separated from the solution in one of the conventional manners such as by decantation, filtering, or centrifuging, and the precipitate is washed to remove the greater part of the soluble salts.

The mixed hydrous oxides prepared as above described, if dried and formed into pills of suitable size and shape, are superior to the various iron-alumina catalysts hitherto proposed as dehydrogenation catalysts. When employed under the autoregenerative conditions described below they allow a certain autoregenerative effect (with respect to the state of oxidation of the reducible oxide). These facts and the significance and importance of various of the points emphasized above are illustrated and/or demonstrated by the following examples.

ACTION OF IRON OXIDE GELS

The reducible metal oxides employed in the catalyst of the invention, namely, the oxides of iron and/or cobalt, are known to possess appreciable dehydrogenation activity and to increase somewhat the formation of aromatic hydrocarbons under cracking conditions. These activities are, however, in no way selective and are short-lived.

Example I

A ferric oxide catalyst was prepared by the precipitation of a dilute solution of ferric nitrate with a 10% excess of ammonium hydroxide. The product was washed, dried at about 150° C. in vacuo, and pelleted. A charge of 0.5 volume of substantially pure liquid normal heptane per volume of catalyst per hour was vaporized, mixed with an equal mol amount of nitrogen, and passed over the catalyst at 485° C. and atmospheric pressure. The liquid product from the first 15 minutes of operation contained 4.5% by weight toluene. That from the second 15 minutes of operation contained 13.8% by weight toluene. That from the third 15 minutes of operation contained 10.25% by weight toluene. The activity of the catalyst then fell rapidly so that after 2 hours of operation the product contained less than 1% by weight toluene.

Example II

A ferric oxide catalyst was prepared by mixing a dilute solution of ferric sulfate and ammonium hydroxide in such a way that the pH of the slurry remained between 7.0 and 8.5 and the pH of the final mixture was adjusted to 7.5±0.05. After aging for 48 hours the hydrous oxide was washed with distilled water until sulfate ions could no longer be detected in the wash water, filtered, dried at 150° C.–160° C., ground, and heat-treated at 500° C. for 6 hours. The oxide was then soaked for 28 hours in a dilute solution of ferric sulfate, then washed with water until the wash water was free from sulfate ions. The product was then dried at 150° C.–160° C. and pelleted with 2% by weight flour. Six-hour test runs, charging 40 ml. of normal heptane per mol of ferric oxide per hour with 25 mol per cent nitrogen and 0.7 mol per cent water vapor added to the charge, showed the following results. At 485° C. and atmospheric pressure the toluene content of the product rose to a maximum of 18% by weight during the first hour and then fell rapidly to less than 1% by weight, the average for the 6-hour period being only 3.6% by weight toluene in the product. After regenerating the catalyst a second run was made under the same operating conditions but at 500° C. The average per cent toluene in the product for the 6-hour period was only 1.7% by weight.

EFFECT OF ALUMINUM OXIDE

Example III

Catalysts were prepared as described in Example I except that varying amounts of aluminum nitrate were substituted for a part of the ferric nitrate. Tests made at 485° C. and atmospheric pressure with fresh catalysts showed the following maxima in toluene formation:

| Mol Per Cent Al₂O₃ in Catalyst | Maximum Per Cent By Weight Toluene in Product |
|---|---|
| 0 | 7.5 |
| 10 | 22.6 |
| 20 | 19.2 |
| 50 | 18.2 |
| 80 | 23.4 |
| 90 | 8.3 |

Example IV

Catalysts were prepared as described in Example II except that varying amounts of aluminum sulfate were substituted for a part of the ferric sulfate and after heat treatment the oxides were washed with a dilute solution of aluminum sulfate in place of the ferric sulfate solution. These catalysts were then employed for the dehydrocyclization of substantially pure normal heptane under the following conditions:

Temperature _____ 485° C. and 500° C.
Pressure _____ Atmospheric
Diluent _____ 25 mol per cent N₂
Water in feed _____ 0.7 mol per cent The average per cents by weight of toluene in the products from 6-hour test periods are given in the following table:

| Catalyst Composition, Mol Per Cent | | Toluene Production | |
|---|---|---|---|
| Fe₂O₃ | Al₂O₃ | 485° C. Per Cent Toluene | 500° C. Per Cent Toluene |
| 100 | 0 | 3.6 | 2.0 |
| 95 | 5 | 4.1 | 10.85 |
| 90 | 10 | 5.8 | 14.7 |
| 85 | 15 | 11.8 | 19.2 |
| 80 | 20 | 16.6 | 20.3 |
| 45 | 55 | 26.2 | 24.2 |
| 30 | 70 | 30.7 | 26.6 |
| 10 | 90 | 21.9 | 29.8 |
| 5 | 95 | 13.8 | 15.2 |

EFFECT OF COMBINATIONS OF REDUCIBLE METAL OXIDES

The reducible metal oxides can be used singly in combination with the alumina, or can be used in various combinations in combination with the alumina. Thus, the oxides of iron and cobalt may be used interchangeably and in various combinations without materially altering the efficiency or character of the catalyst. Manganese oxide and nickel oxide alone, when used in combination with an alumina, give inferior catalysts. It is found, however, that a considerable portion of the iron oxide and/or cobalt oxide may be substituted by the oxides of iron, manganese or nickel with advantage.

Example V

Catalysts were prepared according to the procedure described in Example I by coprecipitation of ferric sulfate, aluminum sulfate and manganese chloride in varying proportions. These catalysts were employed for the dehydrocyclization of normal heptane at atmospheric pressure and a temperature of 500° C. with a charge of 0.4 volume normal heptane per volume of catalyst per hour, vaporized and diluted with an equal volume of nitrogen. The average per cents by weight of toluene in the liquid products obtained over 6-hour periods are given in the following table:

| Atomic Ratio of Fe:Mn:Al in the Catalyst | Average Per Cent by Weight Toluene in the Liquid Product |
|---|---|
| 35: 0:65 | 18.3 |
| 25:10:65 | 20.6 |
| 15:20:65 | 23.6 |

EFFECT OF ANIONS

Example VI

A series of catalysts was prepared containing ferric oxide and alumina in a mol ratio of 30:70, the procedure being substantially that described in Example I. The metal salts employed were the chlorides, nitrates and sulfates. The effect of the acetate ion was determined by adding ammonium acetate to ammonium hydroxide used for precipitating the nitrates in an amount equal to 3 mols acetate ion for each metal ion. The effect of the carbonate ion was determined by precipitating the metal nitrates with ammonium carbonate. The various catalysts were employed for the dehydrocyclization of substantially pure normal heptane at 500° C. and at atmospheric pressure, using a charge of 0.4 volume liquid normal heptane per mole of catalyst per hour, vaporized and mixed with an equal mol amount of nitrogen and 0.3 mol per cent water. A mol of catalyst corresponds to the formula, $(R_nAl_m)_2O_3$, where $n+m=1$. The average per cents by weight of toluene in the liquid products obtained during 6-hour periods are indicated in the following table:

| Hydrous Oxides from— | Precipitant | Per Cent By Weight Toluene in the Liquid Product |
|---|---|---|
| Chlorides | NH₄OH | 16.4 |
| Nitrates | do | 23.7 |
| Acetates | do | 28.2 |
| Sulfates | do | 25.8 |
| Nitrates | (NH₄)₂CO₃ | 24.6 |

Example VII

While the catalysts prepared by coprecipitation of the chlorides, nitrates and acetates tend to be reduced during use to a form which catalyzes carbon and methane formation, those prepared by coprecipitation from the sulfates do not. This effect is most easily demonstrated by comparison of catalysts prepared by substantially the method described in Example I except that in one case nitrates were used while in the other case sulfates were used. Catalysts so prepared were employed for the dehydrocyclization of pure normal heptane under comparable conditions at atmospheric pressure, a temperature of 485° C. and a liquid hourly space velocity of 0.4. The rates of gas production in arbitrary but comparable units vs. time, obtained with the two catalysts, are shown in the following table:

| Rate of Gas Production | Nitrate Catalysts | Sulfate Catalysts |
|---|---|---|
| 1 hour | 70 | 95 |
| 2 hours | 87 | 90 |
| 3 hours | 100 | 80 |
| 4 hours | 125 | 70 |
| 5 hours | | 67 |
| 6 hours | | 65 |

The gas obtained with the sulfate catalyst consisted essentially of hydrogen and the high initial rate of gas production was due to the activity of the catalyst. The rapid rise in gas formation with the nitrate catalyst has been shown by gas analysis to be almost entirely a result of increased methane formation. This rise in methane formation is entirely absent in the sulfate catalyst.

EFFECT OF pH

Example VIII

A series of catalysts containing iron oxide and alumina in a mol ratio of 30:70 was prepared by the addition of approximately 1 molar metal sulfate solution and 1 molar ammonium hydroxide solution to a small amount of water in such a way that the pH of the slurry did not change during the precipitation more than ±0.5 from the final value and that the final volume of the slurry contained ammonium ions in a concentration equivalent to 1 molar ammonium salt solution occupying the same volume. After adjusting the final pH to the desired value, the hydrous oxides were aged for 48 hours, then washed until the wash water gave no traces of sulfate ions, dried at 150° C.–160° C., and pelleted with 2% by weight of flour. The catalysts were employed in the dehydrocyclization of substantially pure normal heptane at a temperature of 500° C. and atmospheric pressure using a charge of 0.4 volume of liquid normal heptane per mol of catalyst per hour, vaporized and mixed with an equal volume of nitrogen. The results expressed in average rates of toluene formation in mols per mol of catalyst per hour are given in the following table:

| Final pH | Rate of Toluene Formation |
|---|---|
| 4.5 | 0.0675 |
| 5.0 | 0.0735 |
| 5.5 | 0.078 |
| 6.0 | 0.0835 |
| 6.5 | 0.087 |
| 7.0 | 0.088 |
| 7.5 | 0.088 |
| 8.0 | 0.085 |
| 8.5 | 0.079 |

Example IX

A catalyst containing iron oxide and alumina in the mol ratio of 30:70 coprecipitated from the sulfates, as above described, was employed for the dehydrocyclization of pure normal heptane under the following conditions:

Temperature _____ 500° C.
Liquid hourly space velocity _____ 0.4
Diluent _____ Equal volume of nitrogen
Added steam _____ 0.6 mol per cent of the hydrocarbon feed The product contained about 24.0% aromatics consisting chiefly of toluene.

As pointed out above, the catalysts just described are superior to those prepared by other methods and are much more stable than catalysts prepared in the same manner and containing the same components in different ratios. Nevertheless, they still are subject to deactivation of the second kind (described below). This is due to the fact that the particular allotropic form of the alumina and the particular state of oxidation of the reducible oxide necessary to produce high and selective activity are unstable and under dehydrogenating conditions tend to revert to more stable forms.

The desired form of the alumina having the spinel type lattice is gamma alumina. This is a labile form of alumina which does not occur naturally. It is converted to the undesired alpha modification by heating to temperatures in the order of 900° C or above. In the presence of small amounts of oxides which are isotropic with it (such as the oxides of iron, nickel, cobalt and molybdenum), this monotropic change takes place at even much lower temperatures. The precipitated hydrous iron oxide when dehydrated to ferric oxide, even at relatively low temperatures, shows only the X-ray pattern for alpha ferric oxide and not the desired ferric oxide having the spinel type lattice. While the desired forms of both the alumina and the ferric oxide tend to change to undesired forms, the desired ferric oxide can be autoregenerated while the desired alumina cannot. This difference depends upon the oxidation-reduction reaction which can occur with iron oxide but not with alumina.

In order to maintain the two described components in the desired forms, the preferred catalysts of the invention are stabilized. This is effected by treating the catalyst under certain prescribed conditions with suitable concentrations of specific stabilizing agents. Suitable stabilizing agents are the oxides of the strongly electro-positive alkali metals (i. e., Li, Na, K, Rb, Cs), the alkaline earth metals (i. e. Be, Mg, Ca, Sr, Ba), copper, and silver. Of these, the lower members (i. e. those having atomic weights and numbers up to calcium) are exceptionally advantageous. The heaviest members (for instance, caesium and barium) appear to be less efficient but so far their possibilities have not been completely investigated. The desired stabilizer or mixture of stabilizers is incorporated into the above-described catalyst components either during the precipitation or coprecipitation, after the precipitation into the wet mixed gel, or after the precipitation and drying of the gel. In the first case, the precipitation is carried out in the presence of such a concentration of the chosen agent that the desired concentration is retained in the gel by occlusion and/or adsorption. In the second case, the desired amount of the stabilizing agent in solution is simply incorporated into the wet gel and the mixture dried. In the third case, the dried gel is impregnated with a solution of the desired stabilizing agent of such concentration and/or amount as to furnish the desired concentration of the stabilizing agent. The gel may then be redried. If necessary, in order to obtain a sufficient concentration of the stabilizing agent, the impregnation may be repeated. Of these alternative methods, the first and second described methods wherein the stabilizer is incorporated in the wet gel are preferred. In these methods the amount of stabilizer to be added may be most easily and positively controlled and the stabilizer is generally more evenly and uniformly distributed throughout the catalyst mass.

The stabilizers, it has been stated, are the oxides of the metals mentioned. However, these oxides generally either do not exist in aqueous solutions or are only slightly soluble. For the purpose of incorporating the desired stabilizers in the catalyst a compound of the chosen metal which is easily converted to the oxide by heating or other equivalent means is usually used. Of these, the water-soluble compounds are most conveniently used. Very suitable compounds are, for instance, the sulfates, nitrates, hydroxides, salts of organic acids, and the like which are appreciably soluble. These materials are converted into the corresponding oxides during a subsequent treatment in the catalyst preparation.

The stabilizing compounds described are employed in the catalysts in relatively small concentrations which are relatively critical. The optimum concentration of the stabilizer depends upon the particular stabilizing agent or mixture of stabilizing agents chosen, upon the ratio of the reducible metal oxide to difficultly reducible oxide in the catalyst, and upon the temperature at which the catalyst is to be used. Thus, the optimum concentration of the stabilizer in the finished catalyst is generally somewhat higher, the higher the ratio of reducible oxide to difficultly reducible oxide and/or the higher the temperature at which the catalyst is to be used. The concentration of the stabilizing metal oxide should, however, in no case exceed about 5 mol per cent of the total metal oxides in the catalyst. An applicable range of concentration of the stabilizing metal oxide is between about 0.3 and 5 mol per cent, based on the combined oxides (anhydrous). Preferred ranges for an iron oxide-alumina catalyst having these oxides in a mol ratio of about 30:70, to be used at temperatures between about 500° C. and 600° C., are, for example, between about 0.5 and 2 mol per cent of the stabilizing metal oxide in the case of the oxides of Li, Na, K, Rb and Cs and between about 1 and 2 mol per cent of the stabilizing metal oxide in the case of the oxides of Be, Mg, Ca, Ba, Cu and Ag.

As will be more fully described below, in most cases an appreciable excess of the stabilizing agent or mixture of stabilizing agents may be initially employed and the excess later removed. Thus, the amount of stabilizing agent, such as the nitrate, incorporated into the gel may be sufficient to afford the indicated desired concentration of the stabilizing metal oxide, or may be somewhat more.

The mixture of hydrous oxides containing the desired concentration of the desired stabilizing agent is dried or partially dried and may then, if desired, be formed into pieces of suitable size and shape for use. The drying is advantageously effected relatively rapidly to avoid concentration of the stabilizing agent on the catalyst surface. Thus, one suitable method for drying the wet hydrogel is to place it in toluene, xylene or a similar material and distil off the major portion of the water. The hydrous oxide mixture may then be dried in an oven or kiln. The dried material may be graded or crushed and graded to produce irregular fragments of the desired size or it may be powdered and, if desired, pelleted. A preferred method of preparation is to remove some of the water and form a suitable paste containing, for instance, 90% water, which is then extruded. The extruded particles, after drying, are advantageously split to expose the inner "skin-free" surface.

The mixed oxides containing the described stabilizing agents in the specified or excess amounts are appreciably more stable than the mixed oxides in the absence of the stabilizing agent. They do not, however, possess their maximum potential stability. Furthermore, except in the cases where the stabilizer applied is the same in kind and amount as the stabilizing promoter described below (in which case it functions primarily in the later-described capacity), the catalysts are relatively inactive due to a very detrimental effect of the kind or amount of the stabilizer present. Thus, certain of the stabilizing agents, notably the oxides of lithium and sodium, when present in an uncombined state on the surface of the catalyst, poison the catalytic activity, and the remaining stabilizing agents, if present in the preferred concentrations specified for the stabilization (which concentrations are generally above the critical limits of the promoters-stabilizers described below), also exert a strong depressing action on the catalytic activity and cause excessive side reactions.

With the possible exceptions mentioned above, the mixed oxides containing the described stabilizing agents in the specified amounts are subjected to a heating treatment at a temperature at or above about 500° C. (but below that causing fusion or excessive sintering). This causes a certain interaction between the catalyst constituents and the stabilizing agent, whereby the stabilizing agent (presumably in the form of the oxide) becomes intimately bound in the catalyst, loses its detrimental effect on the catalyst activity, and the stability of the catalyst is greatly increased. The extent of the interaction and, hence, the improvement in the stability is more or less proportional to the temperature and time of heating and, to a certain extent, upon the kind and concentration of the stabilizing agent present. (This latter is one reason for applying an excess of the stabilizing agent.) Thus, at 500° C. the heating is preferably continued for at least 24 hours, and at 700° C. the heating is preferably continued for at least 6 hours. If the stabilizing agent is incorporated with the dry mixed oxides, somewhat more drastic heat treatment as, for example, 6 hours or more at 700° C. or shorter times at even higher temperatures may be advantageously employed. In view of the exceptional stability of the catalysts even at this stage in their preparation, there is little danger of damaging them by overheating or over-extending the heat treatment.

As pointed out, a certain amount of interaction between the catalyst components and the stabilizing agent takes place during the described heat treatment. Whereas the stabilizing agent in the catalyst prior to the heat treatment is easily removed by washing with a suitable solvent, that which interacts during the heat treatment becomes more or less intimately bound in the catalyst and is removed only with much difficulty. A complete interaction or combination of the stabilizing agent is, however, not effected by even the most drastic permissible heat treatment (probably due to a mass action effect). Since, as pointed out, certain of the stabilizing agents such, in particular, as lithium oxide act as severe poisons when present on the catalyst surface in the free (easily leachable) state, the uncombined excess is removed from the catalyst after the described heat treatment. This may be effected by simply washing the catalyst with a suitable solvent for the stabilizing agent such, for instance, as water, dilute acid or the like. A preferred treatment is to wash the catalyst with a dilute solution (for example, 0.01 to 2 normal) of a salt of one of the principal metal components of the catalyst such, for instance, as a salt of aluminum. Suitable salts are, for instance, the sulfates and nitrates. This treatment is particularly effective in that it readily removes undesired traces of the stabilizing agent which are not intimately bound in the catalyst but are rather strongly held on the surface. After this treatment the catalyst is preferably washed with water to remove the major portions of the occluded salt. This preferred washing treatment is advantageous even in such cases where (as will be pointed out below) it is not necessary to remove the excess stabilizing agent in that it materially increases the selectivity of the finished catalysts.

As pointed out above, it is desired to provide catalysts which are autoregenerative and are capable of effecting practical dehydrogenation and dehydrocyclization under autoregenerative conditions. In order to accomplish this, it is necessary that a particular state of oxidation of the reducible metal oxide component and a particular path of the oxidation-reduction reaction be established and maintained. Taking the preferred iron oxide-alumina base catalysts as an example, the iron oxide tends to undergo the following reactions:

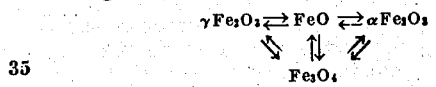

As stated above the desired form is believed to be that having the spinel type crystal lattice (i. e. $\gamma Fe_2O_3$ and $Fe_3O_4$) and the desired state of oxidation is believed to correspond approximately to $Fe_3O_4$. These oxides are particularly prone to form pseudomorphs, i. e. when the crystalline oxides are oxidized or reduced the crystal form of the starting material is often retained in the product even though such a crystal form of the product is thermodynamically unstable. Ferrous oxide, for example, can be oxidized directly either to the stable alpha or labile gamma $Fe_2O_3$. The desired gamma $Fe_2O_3$, which has a spinel type crystal lattice and cannot be distinguished from $Fe_3O_4$ by X-ray analysis of crystal structure, can be formed under conditions where the $Fe_3O_4$ can be formed as an intermediate product. Hence, the gamma $Fe_2O_3$ can be looked upon as a pseudomorph of the $Fe_3O_4$. In order to control the path of the oxidation-reduction reaction and to make a maximum autoregeneration of the catalysts possible, specific concentrations of a second type of stabilizing promoter are also preferably incorporated into the catalysts. Suitable stabilizing promoters are the oxides of the strongly electro-positive alkali metals of high molecular weight and ion size (i. e. K, Rb and Cs, and the oxides of the alkaline earth metals (i. e. Ca, Sr and Ba). Although these oxides function in the desired capacity, they are not equivalent in their action in the catalysts. The members of the first group are considerably more effective than the others but must be applied in small concentrations between very narrow critical limits. Concentrations either above or below these critical limits exert a correspondingly detrimental influence. Within the first group, the oxide of caesium is the most effective, followed by the oxide of rubidium, and finally by the oxide of potassium. Although potassium oxide is the least effective of the three, it is nevertheless very effective and is perhaps the most practical agent in view of its availability and lower cost. The members of the second group are not as effective as the members of the first group but have the great advantage of being applicable over a somewhat broader range of concentrations. Furthermore, concentrations below or above the critical range do not poison the catalysts nearly as severely as do corresponding concentrations of the members of the first group. Of the members of the second group, calcium oxide is the most effective and preferred agent. In the case of the oxides of K, Rb and Cs, suitable concentrations vary between about 0.75 and 2.5 mol per cent of the reducible metal oxide. In the case of the oxides of Ca, Sr and Ba, suitable concentrations vary between about 0.5 and 3 mol per cent of the reducible metal oxide. Within these limits the optimum concentrations depend upon the particular conversion for which the catalysts are to be employed and upon the conditions under which the conversion is to be carried out. Catalysts, which are to be employed for effecting conversions that are prone to produce relatively large amounts of carbon and which are to be employed under relatively severe conditions, generally contain the highest optimum concentrations of these stabilizing promoters.

Thus, for example, a preferred catalyst for the dehydrocyclization of heptane at temperatures in the order of 485° C. to 525° C. comprises iron oxide and aluminum oxide in a mol ratio of 30:70, coprecipitated from the mixed metal sulfates by ammonium hydroxide at a final pH of about 7.5, stabilized with about 1 mol per cent lithium oxide and between about 0.2 and 0.4 mol per cent potassium oxide.

A preferred catalyst for the dehydrogenation of butylene to butadiene at temperatures in the order of 600° C. to 700° C., on the other hand, comprises iron oxide and aluminum oxide in a mol ratio of 30:70, coprecipitated from the mixed metal sulfates by ammonium hydroxide at a final pH of about 7.5, stabilized with about 1 mol per cent lithium oxide and about 0.4 to 1.0 mol per cent potassium oxide.

The promoter-stabilizer agent may be incorporated into the catalysts in various ways such as described above for the stabilizing agents, and they may be incorporated into the catalysts at any convenient point in the preparation. When an oxide of lithium, sodium, copper or silver is employed as the stabilizing agent and when the catalyst is subjected to the described washing treatment, the promoter is preferably incorporated after the heating and/or washing treatment.

It will be noted that certain of the stabilizing agents and stabilizing promoters (the oxides of K, Rb, Cs, Ca, Sr and Ba) may function in both capacities. It is to be particularly noted that in these cases there is nevertheless a clear and distinct line of demarcation between the functions, and the concentrations allotted for each function must be controlled. Thus, although there may be only one stabilizing oxide present in the catalyst, there may be, in fact, two distinct portions of the material, each acting in a separate capacity and therefore, in fact, two stabilizers present. As pointed out above, the stabilizing oxide is more or less bound in the catalyst. The promoting oxide, even though it may be the same agent, is not so bound. In such cases where the same agent is used for both purposes, the heated treated catalyst, after washing out excess agent, may be impregnated with a properly adjusted further concentration of the agent. Also, if the original concentration of the agent is properly adjusted, the catalyst, after the described heat treatment, will contain the desired concentrations of stabilizing agent and promoter, and the described washing treatment may be dispensed with. In many cases, a small excess of a stabilizer which acts in both capacities is employed and after the heat treatment a small additional quantity of a different promoter is incorporated, thus giving a catalyst having one stabilizing agent and a mixture of stabilizing promoters. In such cases, and also in such cases where a mixture of stabilizing agents may be applied, the effect of the agents for either function is approximately additive and the concentrations should be adjusted accordingly.

In addition to the above-described stabilizing promoters, the catalysts may contain small amounts of oxides of cerium and/or thorium. These compounds, if added, increase the activity of the catalysts somewhat and, hence, act as promoters in the more usual sense of the term.

The catalysts constituted and prepared as above described may be used in any desired form such, for instance, as a fine powder, fragments, or variously formed shapes such as pellets, balls, macaronis, etc., in any of the conventional manners. They are particularly designed and developed for use under special conditions presently to be described for effecting various dehydrogenation and/or dehydrocyclization processes. When employed in such processes under properly adjusted conditions, they afford excellent conversions comparable to the better of the prior-known catalysts. In the case of the preferred catalysts of the invention, however, when used under properly adjusted conditions, the conversions may be retained at high levels for long periods of time before regeneration or replacement of the catalyst is necessary. This retention of the catalytic activity is due to three factors, the first of which is the structural stability of the catalysts, the second of which is the autoregenerative effect with respect to the oxidation state of the catalyst, and the third of which is the autoregenerative effect with respect to the removal of carbonaceous deposits. In the metal oxide catalysts hitherto used the activity declines with use in processes of the type in question in at least three ways. In the first place, the active metal oxide in the catalyst gradually becomes reduced to an inactive state under the reducing conditions of the treatment. This deactivation is temporary since the catalyst is reoxidized in the periodic regeneration treatment. This deactivation is nevertheless disadvantageous since it prohibits the use of long process period, even if the deactivation due to deposition of carbonaceous deposits is eliminated. Furthermore, after the regeneration, the catalyst is usually in a state of oxidation higher than desired; it therefore oxidizes part of the reaction mixture and gives relatively low conversions over a certain induction period during which it is reduced to the desired state. The difficultly reducible oxides such as those of chromium, molybdenum, etc. are relatively but not completely stable against this type of deactivation and it is largely for this reason that they have proved to be the best of the hitherto-known catalysts.

Simultaneously with the above-described deactivation mechanism the hitherto-known catalysts undergo a more gradual deactivation of deep-seated nature. This deactivation is caused by certain structural changes which take place within the catalysts. These changes are accelerated by elevated temperatures. Thus, although they may take place relatively slowly at the temperatures required in dehydrogenation processes, they take place relatively rapidly at the high temperatures invariably encountered in the regeneration. Consequently, those catalysts which require the most frequent regeneration also suffer, in general, the greatest loss in activity due to these changes. Since this loss of activity is permanent (i. e. the catalysts cannot be brought back to the original activity by any known methods), the effective life of these catalysts is relatively short.

The third cause of deactivation of the prior art catalysts when used in processes of the type in question is the deposition of carbonaceous matter on the catalyst. None of the known catalysts is sufficiently selective in its action to allow the desired conversions to be carried out without at least some side reactions such as cracking, polymerization and further dehydrogenation. Consequently, all of the known catalysts gradually become coated with carbon and tarry deposits produced by such side reactions, and these deposits generally are sufficient to cause a serious loss of the catalytic activity in a very short time. Thus, although some very special catalysts have been developed which allow conversion periods up to about 24 hours, most of the catalysts used commercially lose substantially all of their useful activity under conventional processing conditions in a period of from about 1 to 6 hours. This relatively rapid decline in the catalytic activity can be counteracted indefinitely by periodically burning the carbonaceous deposits from the catalyst, i. e. by a conventional regeneration treatment. For the reasons more fully set forth near the beginning of this specification, the necessity for regenerating the catalyst at frequent intervals constitutes one of the most important drawbacks to the use of catalysts of this type.

By employing the catalysts and the processes of the present invention, these disadvantages are greatly reduced. This is due to the facts that the catalysts of the invention are stabilized against deterioration of the first kind and are so adjusted in composition that they are more or less self-regenerating with respect to the deteriorations of the second and third kinds when employed under autoregenerative conditions.

When carrying out processes in an autoregenerative manner according to the method of the invention, a critically controlled concentration of steam is maintained in the reaction zone. This steam maintains the desired oxidation state of the catalyst and reacts with the carbonaceous material on the catalyst surface to produce carbon dioxide and a small amount of carbon monoxide. Thus, there is in effect a continuous low temperature removal of the carbonaceous deposits substantially as soon as they are laid down on the catalyst surface. The concentration of steam in the reaction zone required to give the desired results is very critical and is specific for each specific catalyst, each specific conversion, and each set of reaction conditions. It cannot therefore be stated in terms of definite percentages. The desired concentration is, however, quite definite in any particular case and very simply determined. Thus, it is only necessary to add an amount of steam which is known to be excessive (in which case, the liquefied product will appear cloudy due to water) and then to decrease the concentration of steam until no noticeable water is found in the product. The concentration of steam is not reduced beyond this point but is maintained as close to this point as possible. Thus, under the desired conditions, the maximum concentration of steam which shows no noticeable water in the product is maintained in the reaction zone. This adjustment of the concentration of steam is preferably made after the catalyst has been on-stream for a few hours and is preferably checked at periodic intervals. This is because a certain amount of reduction of the catalyst usually takes place when first using a fresh catalyst until the desired stable state is reached, and this reduction produces a small amount of water. After a short initial period of operation the catalyst reaches the desired stable state. The concentration of added water may then be accurately adjusted and controlled. The desired concentration of steam may also be arrived at initially in the opposite direction, that is, by adding increasing increments until the desired concentration is reached. This is permissible since, as pointed out, the fresh catalyst when first used produces a small amount of water. It is otherwise detrimental to allow the concentration of steam to remain below the desired concentration for any appreciable period of time since under these conditions the catalyst becomes coated with carbon. Excess steam is very detrimental in that it poisons the catalyst and reduces the conversions severely. This effect of excess steam is, however, only temporary (that is, it is only noted as long as the excess concentration is present) and does not reduce the activity of the catalyst as do carbonaceous deposits resulting from an insufficient concentration of steam.

The above-described autoregeneration of the catalysts of the invention is made possible by the particular compositions of the catalysts in combination with the specific concentrations of steam in the reaction zone. This involves the critical balance of the several factors. Thus, the catalysts are prepared with only certain readily reducible oxides (in combination with certain concentrations of alumina) which have oxidation-reduction potentials which are suitable. These combinations of oxides are preferably stabilized as to form to allow the desired state to be established and maintained. These combinations of oxides are then preferably treated to increase their selectivity and to reduce their carbon-depositing tendency to a point where it can be counteracted by the autoregeneration. The oxidation state of the catalytic components is maintained at a critical desired state affording maximum conversion by control of the concentration of steam in the reaction zone. This is made possible by critical concentrations of a second stabilizing promoter in the catalyst. The concentration of steam due to the balance existing is just sufficient to exert a maximum autoregenerative effect. The second stabilizer also promotes the autoregeneration with respect to carbon and its concentration is also balanced to afford the maximum autoregeneration. From the above it will be seen that any variations which upset these balances will result in catalyst which are inferior or entirely unsuitable. Thus, other oxides such as chromium oxide, molybdenum oxide, tungsten oxide, vanadium oxide, titanium oxide, etc. cannot be substituted. If the reducible oxides employed are not used in combination with the alumina and/or in the specific concentrations, the catalysts quickly revert to undesirable forms and give decreased conversions and large carbon depositions. If the concentration of the second stabilizer-promoter is not properly adjusted, the catalyst is poisoned and the steam, instead of reacting with the deposited carbon, reacts with the reactant, thus eliminating the autoregenerative effect.

The catalysts of the invention possess high and selective activity for dehydrogenation and dehydrocyclization and are particularly designed to allow these conversions to be carried out with a maximum autoregenerative effect. Thus, the process of the invention may be advantageously employed for the catalytic dehydrogenation of a wide variety of dehydrogenatable materials. A few typical dehydrogenation conversions for which the process of the invention may be advantageously applied are, for example, the dehydrogenation of dehydrogenatable normally gaseous hydrocarbons such as ethane, propane, butane, isobutane, and the butylenes to the corresponding dehydrogenated products; the dehydrogenation of normally liquid paraffin hydrocarbons such as pentane, isopentane, the hexanes, the heptanes, the octanes, paraffinic petroleum fractions, etc.; the dehydrogenation of the various normally liquid olefins such as the amylenes, hexylenes, etc. to the corresponding diolefins and/or acetylenes; the dehydrogenation of naphthenic hydrocarbons such as cyclopentane, methyl cyclopentane, dimethyl cyclopentane, cyclohexane; methyl cyclohexane, dimethyl cyclohexane, cyclohexene, decalin, tetrahydronaphthalene, etc. to the corresponding olefins, diolefins and/or aromatic hydrocarbons; the dehydrogenation of indene; acenaphthene, ethyl benzene, isopropyl benzene, etc. to their corresponding dehydrogenated derivatives; the dehydrogenation of various hydrocarbon derivatives such as 1-chlor-butene-2 and other halogenated hydrocarbons, piperidine, tetrahydrochinolin and other dehydrogenatable heterocyclic nitrogen compounds, methyl thiophane and other dehydrogenatable heterocyclic sulfur compounds. The catalysts and process of the invention are also advantageous for effecting dehydrocyclization of suitable starting materials by the simultaneous ring-closure and dehydrogenation. Thus, the catalysts and process of the invention are particularly advantageous for the synthesis of aromatic hydrocarbons from heptane and heptane fractions.

The conditions of temperature, pressure, space velocity, etc. applicable for these various conversions are well known. Thus, for the production of diolefins the temperatures are relatively high and the partial pressures of the reactants are preferably maintained quite low either by the use of low pressure or by the use of a suitable diluent. For the production of aromatic materials by dehydrocyclization the temperatures are relatively high and the contact time is relatively long, compared to those most suitable for olefin production. The process of the invention may be carried out under conditions of temperature, pressure and space velocity suitable for any of these dehydrogenation reactions. Thus, the process may be carried out at temperatures ranging from about 400° C. to about 800° C., at pressures ranging from a fraction of an atmosphere up to several atmospheres, and at any suitable space velocity. Also, various diluents such as nitrogen, methane, etc. may be employed, if desired.

The process of the invention is preferably carried out with the reactant in the vapor phase. Any of the various methods of disposing the catalyst and effecting contact in such vapor phase dehydrogenation conversion may be employed.

Most of the materials treated according to the process of the invention contain small to appreciable concentrations of sulfur compounds which are usually considered as impurities. The presence of such impurities is in no way harmful in the process of the invention. In fact, it appears that a small amount of sulfur compounds (equivalent to at least 0.01% sulfur) is quite advantageous. Generally, an appreciable portion of the sulfur-containing impurities are removed or altered in the treatment.

Although the preferred catalysts of the invention are designed, compounded and prepared to afford a maximum autoregenerative effect under autoregenerative conditions which coincide with those affording high and selective conversions, it is sometimes necessary or desirable to resort to regeneration of the conventional kind. This is usually the case when it is attempted to force the conversion to such an extent that the rate of carbon deposition is beyond that which can be counterbalanced by the autoregeneration. Except when operating at temperatures above about 600° C., this cannot be remedied by increasing the concentration of steam above the described limit for the reasons explained above. The regeneration of the catalysts of the invention, when and if such regeneration is desired or necessary, may be effected in any of the conventional manners. An advantage of the present catalysts in this respect is that due to their exceptional stability they are much less prone to be damaged by such regeneration treatments and the elaborate precautions usually required to maintain a low maximum regeneration temperature are not necessary. Another advantage of the preferred catalysts over most, but not all, of the prior art catalysts in this respect is that they may, if desired, be regenerated with steam, or a mixture of steam and oxygen.

I claim as my invention:

1. The method for the preparation of catalysts suitable for use for dehydrogenation and dehydrocyclization reactions and particularly adapted to be employed in an autoregenerative manner which comprises the steps of forming a coprecipitated mixture of hydrous oxides comprising between 20 and 75 mol per cent (calculated as $R_2O_3$) of a hydrous reducible oxide of a metal selected from the group consisting of iron and cobalt and between 25 and 80 mol per cent (calculated as $Al_2O_3$) of alumina, said precipitated hydrous oxides being formed from dilute solution in the presence of sulfate ion at a pH above 6 and under final conditions of pH between 7.0 and 8.0, washing the mixture and impregnating the mixture with a compound of potassium convertible to the oxide by heat in an amount equivalent to between 0.75 and 2.5 mol per cent of potassium oxide.

2. The method for the preparation of catalysts suitable for use for dehydrogenation and dehydrocyclization reactions and particularly adapted to be employed in an autoregenerative manner which comprises the steps of forming a mixture of coprecipitated hydrous oxides comprising about 30 mol per cent (calculated as $Fe_2O_3$) of a hydrous iron oxide and about 70 mol per cent (calculated as $Al_2O_3$) of alumina, said precipitated hydrous oxides being formed from dilute solution in the presence of sulfate ion at a pH above 6 and under final conditions of pH between 7.0 and 8.0, washing the mixture and impregnating the mixture with a compound of potassium convertible to the oxide by heat in an amount equivalent to between 0.75 and 2.5 mol per cent of potassium oxide.

3. A method according to claim 2 in which a hydrous oxide of a metal selected from the group consisting of manganese and nickel is substituted in part for the iron oxide.

4. The method for the preparation of catalysts suitable for use in dehydrogenation and dehydrocyclization reactions and particularly adapted to be employed in an autoregenerative manner which comprises the steps of forming a mixture of co-precipitated hydrous oxides comprising between 20 and 75 mol per cent (calculated as $R_2O_3$) of a hydrous reducible metal oxide of a metal selected from the group consisting of iron and cobalt and between 25 and 80 mol per cent of alumina, said hydrous oxides being precipitated in the presence of sulfate ion at a pH above 6 and under final conditions of pH between 7.0 and 8.0, washing the mixture, incorporating a compound of potassium convertible to the oxide by heat in an amount equivalent to between 0.75 and 2.5 mol per cent of the corresponding oxide, and calcining the mixture at a temperature of at least 500° C. and below the fusion point for a minimum time which varies inversely with the temperature and is at least 24 hours at 500° C. and 6 hours at 700° C.

5. The method for the preparation of catalysts suitable for use for dehydrogenation and dehydrocyclization reactions and particularly adapted to be employed in an autoregenerative manner which comprises the steps of forming a mixture of co-precipitated hydrous oxides comprising between 20 and 75 mol per cent (calculated as $R_2O_3$) of a hydrous reducible oxide of a metal selected from the group consisting of iron and cobalt and between 25 and 80 mol per cent of alumina, said hydrous oxides being precipitated in the presence of a sulfate ion at a pH above 6 and under final conditions of pH between 7.0 and 8.0, washing the mixture, incorporating a compound of lithium convertible to the oxide by heat in an amount equivalent to between 0.3 and 5 mol per cent of the corresponding oxide, heating the mixture at a temperature of at least 500° C. and below the fusion point for a minimum time which varies inversely with the temperature and is at least 24 hours at 500° C. and 6 hours at 700° C., washing the catalyst to remove free lithium oxide, and impregnating the catalyst with a compound of potassium convertible to the oxide by heat in an amount equivalent to between 0.75 and 2.5 mol per cent of the corresponding oxide.

6. The method for the preparation of catalyst suitable for use for dehydrogenation and dehydrocyclization reactions and particularly adapted to be employed in an autoregenerative manner, which comprises the steps of forming a mixture of coprecipitated hydrous oxides comprising between 20 and 75 mol per cent (calculated as $R_2O_3$) of a hydrous reducible oxide of a metal selected from the group consisting of iron and cobalt and between 25 and 80 mol per cent of alumina, said hydrous oxides being precipitated at a pH above 6 and under final conditions of pH between 7.0 and 8.0 in the presence of sulfate ion, washing the mixture, incorporating a compound convertible to the oxide by heat of an alkali metal in an amount equivalent to between 0.3 and 5 mol per cent of the corresponding oxide, heating the mixture at a temperature of at least 500° C. and below the fusion point for a minimum time which varies inversely with the temperature and is at least 24 hours at 500° C. and 6 hours at 700° C., washing the mixture to remove water soluble alkali, and then impregnating the mixture with a compound of potassium convertible to the oxide by heat in an amount equivalent to between 0.75 and 2.5 mol per cent of potassium oxide.

CARLOS L. GUTZEIT.

REFERENCES CITED

The following references are of record in the file of this patent:

UNITED STATES PATENTS

| Number | Name | Date |
| --- | --- | --- |
| 1,172,062 | Schwarcman | Feb. 15, 1916 |
| 1,844,963 | Larson | Feb. 16, 1932 |
| 2,085,129 | Stoewener | June 29, 1937 |
| 2,129,142 | Kuentzel et al. | Sept. 6, 1938 |
| 2,131,089 | Beeck et al. | Sept. 29, 1938 |
| 2,156,904 | Ruthruff | May 2, 1939 |
| 2,163,602 | Jenness | June 27, 1939 |
| 2,172,534 | Grosse | Sept. 12, 1939 |
| 2,180,672 | Frey | Nov. 21, 1939 |
| 2,212,112 | Clausen | Aug. 20, 1940 |
| 2,270,504 | Burk et al. | Jan. 20, 1942 |
| 2,271,751 | Visser et al. | Feb. 3, 1942 |
| 2,284,468 | Burk et al. | May 26, 1942 |
| 2,296,405 | Scheurmann et al. | Sept. 22, 1942 |
| 2,315,107 | Chickenoff et al. | Mar. 30, 1943 |
| 2,335,550 | Sturgeon | Nov. 30, 1943 |
| 2,361,825 | Doumani | Oct. 31, 1944 |
| 2,370,797 | Kearby | Mar. 6, 1945 |
| 2,392,750 | Linn | Jan. 8, 1946 |

FOREIGN PATENTS

| Number | Country | Date |
| --- | --- | --- |
| 140,371 | Great Britain | Dec. 9, 1920 |